United States Patent
Ploug et al.

[11] Patent Number: 6,117,395
[45] Date of Patent: Sep. 12, 2000

[54] DISTRIBUTOR DEVICE, IN PARTICULAR FOR A CHEMICAL ANALYSIS ARRANGEMENT

[75] Inventors: Ole Ploug, Struer; John Thrane Hansen, Vipperød; Jakob Bøgh Schubert, Herlev; Steen Gaardsted Kristensen, Nordborg; Theiss Stenstrøm, Sønerborg, all of Denmark

[73] Assignee: Danfoss A/S, Nordborg, Germany

[21] Appl. No.: 08/983,280

[22] PCT Filed: Jul. 4, 1996

[86] PCT No.: PCT/DK96/00303

§ 371 Date: Aug. 3, 1998

§ 102(e) Date: Aug. 3, 1998

[87] PCT Pub. No.: WO97/02892

PCT Pub. Date: Jan. 30, 1997

[30] Foreign Application Priority Data

Jul. 7, 1995 [DE] Germany .................. 195 24 795

[51] Int. Cl.[7] .................. B10L 3/00; G01N 1/10
[52] U.S. Cl. .................. 422/100; 422/68.1; 216/33
[58] Field of Search .................. 422/50, 58, 99, 422/103, 104, 100, 102, 68.1; 436/165, 180, 183; 216/33

[56] References Cited

U.S. PATENT DOCUMENTS

| | | | |
|---|---|---|---|
| 3,726,764 | 4/1973 | White | 435/305.1 |
| 4,911,782 | 3/1990 | Brown | 156/633 |
| 4,948,442 | 8/1990 | Manns | 156/73.1 |
| 5,147,607 | 9/1992 | Mochida | 422/57 |
| 5,571,721 | 11/1996 | Turner | 435/305.1 |
| 5,755,942 | 5/1998 | Zanzucchi et al. | 204/454 |

*Primary Examiner*—Long V. Le
*Attorney, Agent, or Firm*—Lee, Mann, Smith, McWilliams, Sweeney & Ohlson

[57] ABSTRACT

A distributor, in particular for a chemical analysis arrangement, is disclosed, having at least two plate-like housing parts which lie against each other with respective contact faces, wherein in the contact face of at least one housing part there is provided at least one channel that is covered by the other housing part. In a distributor device of that kind it is desirable to be able to structure the channels as precisely as possible and for the channels to be well-sealed, and for the volume to correspond as accurately as possible to a predetermined value. To that end, in one of the two contact faces there is provided a recess for receiving a bonding agent, which recess is arranged adjacent to the channel and follows its course.

36 Claims, 1 Drawing Sheet

DISTRIBUTOR DEVICE, IN PARTICULAR FOR A CHEMICAL ANALYSIS ARRANGEMENT

BACKGROUND OF THE INVENTION

The invention relates to a distributor device, in particular for a chemical analysis arrangement, having at least two plate-like housing parts which lie against each other with respective contact faces, wherein in the contact face of at least one housing part there is provided at least one channel that is covered by the other housing part.

In a known distributor device of that kind, (U.S. Pat. No. 4,607,526), one housing part is in the form of a base plate with a rigid surface, whilst the other housing part is in the form of a flexible cover plate. The cover plate is clamped to the base plate by means of a steel plate. A clamping device which is arranged at the circumference of the base plate and the steel plate is provided for that purpose.

For many chemical analyses, it is necessary for the volume of the channel to correspond relatively accurately to a predetermined value, because the channel volume influences the amount of a fluid that is used in an analysis. In particular, the accuracy becomes increasingly important, the smaller are the volumes of the media to be analyzed.

In the case of the above-mentioned distributor device, the cross-sections of the channel or the channels are poorly defined. These cross-sections are dependent substantially on the force with which the steel plate is pressed against the base plate. This force can be rendered uniform over the entire area of the steel plate only with difficulty, however. There is a risk, for example, that the force will be larger at the clamping points than at other points. There must nevertheless be a certain application force, because otherwise it could no longer be possible to ensure tight sealing of the individual channels.

SUMMARY OF THE INVENTION

The invention is based on the problem of providing a distributor device, the channels of which have a volume that is determinable as accurately as possible, which channels are sealed, and which device is inexpensive to manufacture.

In a distributor device of the kind mentioned in the introduction, this problem is solved in that in one of the two contact faces there is provided a recess for receiving a bonding agent, which recess is arranged adjacent to the channel and follows its course.

The bond between the two housing parts is therefore ensured by the bonding agent which is arranged in the recess. The bonding agent at the same time seals the channel. Since the recess follows the course of the channel, the bond between the two housing parts is effected always in the immediate vicinity of the channel, so that compliance with the desired channel cross-section, and thus compliance with the desired channel volume, is largely ensured. At the same time the channel is sealed along its course, so that no undesirable voids into which the fluid can escape from the channel can form. Bonding of two parts by means of a bonding agent arranged in a recess is not novel per se. The Karisruhe nuclear research centre, for example, has put forward a micromembrane pump for conveying gases, in which a membrane is bonded to the appropriate housing parts by injecting an adhesive into a cavity which is provided in a housing part and is covered by the membrane.

The recess is preferably formed in the same housing part as the channel. This simplifies manufacture of the housing parts. One housing part can here possibly remain virtually unmachined.

It is also advantageous when the recess is connected to a feed opening which passes through a housing part. In that case, the bonding agent can be introduced through the feed opening into the recess. It is easier for a suitable connection for the supply of the bonding agent to be created on the side of the housing part lying away from the contact face.

It is equally advantageous for the channel to be in connection with connection openings which pass through a housing part. In that case the recess can, for example, surround the channel. It is not necessary to provide connections which open at the front face of the housing parts. This simplifies sealing of the channel or channels.

Between the channel and the recess there is preferably arranged a separating web which is of approximately linear form in the region of the contact face. The separating web is therefore very narrow in the region of the contact face; in practice it must still have a certain magnitude so that a width sufficient for the seal can be achieved. The recess is therefore separated from the channel only by the very narrow separating web. The bonding agent which is arranged in the recess can therefore effect the bond between the two housing parts and also sealing of the channel in the immediate vicinity of the channel. In this manner compliance with the desired volume of the channel can be radically improved.

It also preferable for the separating web to widen from the contact face towards the housing part which carries it. The separating web thus becomes mechanically stronger. On being joined, the two housing parts can be pressed together with the necessary force, without risk of the separating web thereby being damaged.

The bonding agent is preferably a free-flowing material which is hardenable. The material can be introduced into the recess in its free-flowing form. After that it can harden in order to ensure not only the bond between the two housing parts but also sealing of the channel.

In that case, it is especially preferred for the material to be free-flowing in a warmed state and to harden on cooling. Before joining of the two housing parts the bonding agent is therefore warmed or heated. After cooling, for example, to ambient temperature, the beyond between the two housing parts is fixedly formed.

It is also advantageous for the material to be similar or identical to the material of which the housing parts are made. In particular when the bonding agent is warmed or heated, the two housing parts are thus virtually welded to one another. When the material which forms the bonding agent is the same as the material of which the housing parts are formed, the distributor device is constructed virtually in one piece.

The material is preferably injection-mouldable. The bonding agent is then injected into the recess. After hardening, the desired bond is achieved.

The material is preferably a plastics material. Such a material is easy to handle.

In another preferred construction, the material of the housing parts and of the bonding agent is aluminum. Aluminium will be used in particular and preferably whenever a relatively high strength and/or a better heat conductivity is desired.

The bonding agent can also simply be an adhesive. The adhesive then bonds the two housing parts securely and permanently.

In a preferred construction the channels and/or the recesses can be provided in both contact faces. This simplifies the construction of the channels and the construction of the recess in larger or more complicated distributor devices.

Moreover, in an advantageous construction more than two housing parts which are superimposed one on top of the other in the manner of a stack can be provided, housing parts arranged inside the stack having two contact faces. In this manner, with several channels, cross-overs in the channel system can be achieved, without the fluid passing from one channel into the other.

The channel can be created by milling or stamping. It can also be produced by constructing the housing part having the channel as a casting which is cast with the channel, that is, is produced simultaneously during casting. All three possibilities permit the channel or channels to be very precisely structured, without adversely affecting the dimensional accuracy. The channel cross-section can therefore be adhered to with the desired accuracy.

Several channels that are separated by at least one space are preferably provided, the space being occupied almost entirely by the recess. In this manner a large-area bond between the two housing parts is achieved. Of course, other components important or necessary for the construction or function of the distributor device can be arranged in the space or spaces, for example, lands for add-on parts.

BRIEF DESCRIPTION OF THE DRAWINGS

The invention is described hereinafter with reference to a preferred embodiment in conjunction with the drawings, in which.

DESCRIPTION OF THE PREFERRED EMBODIMENTS

Figure 1:
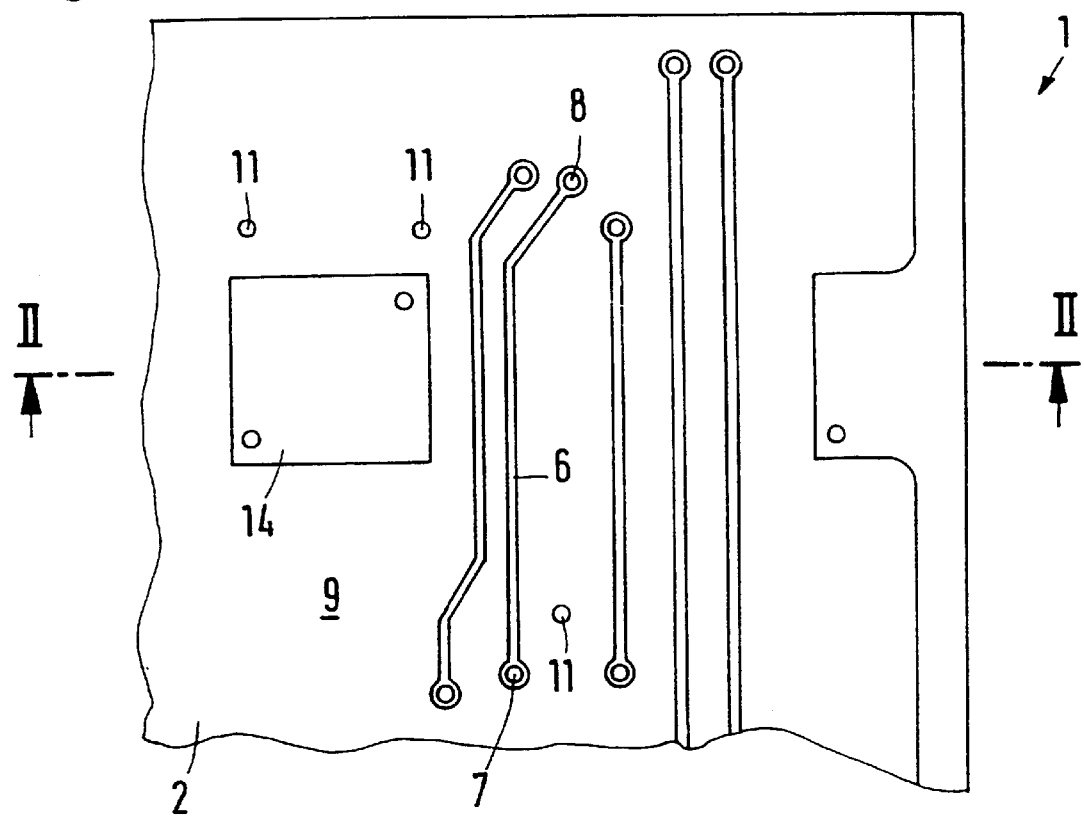
FIG. 1 is a plan view of a housing part.
Figure 2:
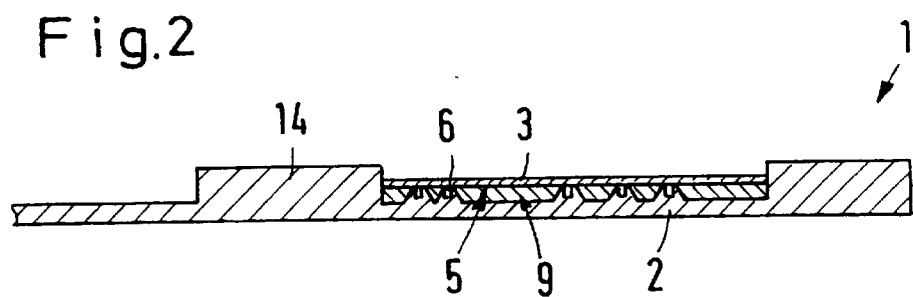
FIG. 2 is a section II—II as shown in FIG. 1.

A distributor device 1 comprises two plate-like housing parts, a base plate 2 and a cover plate 3, which can be denoted generally also as housing parts. Base plate 2 and cover plate 3 lie against each other with facing contact faces 4, 5.

Channels 6 are formed in the contact face 4 of base plate 2, each channel having connection openings 7, 8 which pass through the base plate 2.

The base plate 2 further has a recess 9 which is arranged adjacent to the channels 6 and surrounds the channels 6, that is, follows their course. In the recess 9 there is arranged a bonding agent 10 which bonds the base plate 2 and the cover plate 3 to one another.

The bonding agent 10 can be simply an adhesive. It may also be the same material of which the base plate 2 and the cover plate 3 consist, in particular a plastics material, such as polypropylene or polyethylene.

To produce the distributor device 1, the cover plate 3 and the base plate 2 are simply brought to bear against one another. The bonding agent 10 is then injected through an opening 11 into the recess 9 in an injection-moulding process. For that purpose the bonding agent 10 can be rendered free flowing, for example, by warming. After cooling, it solidifies and bonds the two housing parts 2,3 to one another by force of contraction.

A metal, in particular aluminium, can be used as an alternative to plastics material.

The channels 6 are separated from the recess 9 by separating webs 12. The separating webs 12 are approximately triangular or trapezoidal in cross-section, that is, starting from the base plate 2 they taper towards the cover plate 3, so that their contact region 13 is very narrow. It approximates to a line. Of course, for reasons connected with manufacturing technology it will have a finite magnitude. This construction of the separating webs 12 enables the bonding agent 10 to be brought up close to the channels 6. The channels 6 are thus well sealed. The bond between the base plate and the cover plate 3 is effected in the immediate vicinity of the channels 6. As is especially clear from FIG. 3, the separating webs 12 are constructed so that the walls forming the channel 6 run approximately perpendicular to the contact face 5, whilst the outer flanks 15 of the separating webs 12 slope towards the outside.

Figure 3:
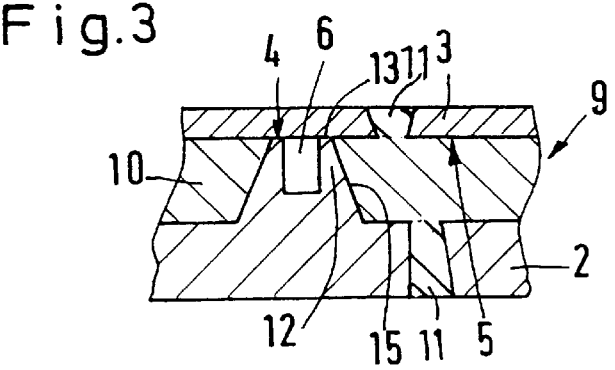
FIG. 3 is an enlarged fragment of the view according to FIG. 2.

As is especially clear from FIG. 3, the channels 6 are not made as deep in the base plate 2 as the recess 9. The greater depth of the recess 9 facilitates the introduction of the bonding agent 10 by casting or injection-moulding. If, on the other hand, the bonding agent is in the form of a simple adhesive, the recess 9 can instead be made shallower than the channels 6.

There are a number of possibilities for producing the channels 6. If the base plate 2 is in the form of a casting or injection-moulded part, the channels 6 and their surrounding separating webs 12 can be produced during the moulding operation. On the other hand, the recesses 9 can also be produced by milling and the channels 6 can be sunk into the elevations left behind. The elevations left behind then form the separating webs 12. Finally, the channels 6 and the recess 9 can also be produced by stamping.

With the last method a very precisely structured channel system can be achieved.

In the illustration, the recess 9 takes up the entire space between the channels 6. This is not necessary, but simplifies manufacture of the base plate 2. The recess 9 is shown to be simply continuous. This too is not absolutely necessary. Several recesses 9 could also be provided, corresponding feed openings 11 then having to be provided for each recess 9.

Lands 14 which serve later on for receiving add-on elements, such as valves, pumps or the like, are furthermore provided in the recess 9. These lands 14 can also be used during manufacture of the distributor device 1 to position the cover plate 3 in the correct position on the base plate 2.

A distributor device in which the channels are provided only in the base plate 2 is illustrated. Alternatively, of course, the channels could be provided in the cover plate 3, if this is of suitable thickness. It is also possible to provide channels and connecting openings and feed openings 7, 8, 11 in both the base plate 2 and the cover plate 3.

In the construction illustrated, only two housing parts 2, 3 are provided. Alternatively, several housing parts could be provided, and these are then layered one on top of the other in the manner of a stack; housing parts inside the stack then having on both sides a respective contact face with the adjacent housing parts. In this case the housing parts can be provided with channels on one side or on both sides. Housing parts which serve merely as cover plates are also possible.

What is claimed is:

1. Distributor device for a chemical analysis arrangement, comprising at least two plate housing parts which lie against each other with respective contact faces, the contact face of at least one housing part having at least one channel that is covered by the other housing part, one of the two contact faces having a recess for receiving a bonding agent, and including a separating web between the channel and the recess, the web being in a narrow form in the area of the contact faces, being arranged adjacent to the channel and following its course.

2. Device according to claim 1, in which the recess is formed in the same housing part as the channel.

3. Device according to claim 1, in which the recess is connected to a feed opening which passes through one of the housing parts.

4. Device according to claim 1, in which the channel is in connection with connecting openings which pass through a housing part.

5. Device according to claim 1, in which the separating web is approximately a line in the region of the contact face.

6. Device according to claim 1, in which the separating web widens from the contact face towards the housing part which carries it.

7. Device according to claim 1, in which the bonding agent is a free-flowing material which is hardenable.

8. Device according to claim 7, in which the material is free-flowing in a warmed state and hardens on cooling.

9. Device according to claim 7, in which the material is at least similar to the material of which the housing parts are made.

10. Device according to claim 7, in which the material is injection-mouldable.

11. Device according to claim 7, in which the material is a plastics material.

12. Device according to claim 7, in which the material of the housing parts and of the bonding agent is aluminum.

13. Device according to claim 7, in which the bonding agent is an adhesive.

14. Device according to claim 1, in which at least one of the channels and the recesses is provided in both contact faces.

15. Device according to claim 1, in which more than two housing parts superimposed one on top of the other in the manner of a stack are provided, the housing parts arranged inside the stack having two contact faces.

16. Device according to claim 1, in which the channel is a milled channel.

17. Device according to claim 1, in which the channel is a stamped channel.

18. Device according to claim 1, in which the housing part having the channel is constructed as a casting cast with the channel.

19. Device according to claim 1, including several channels separated by at least one space, the space being occupied substantially by the recess.

20. Distributor device for a chemical analysis arrangement, comprising at least two plate housing parts which lie against each other with respective contact faces, the contact face of at least one housing part having at least one channel that is covered by the other housing part, one of the two contact faces having a recess for receiving a bonding agent, and further comprising a separating web located between the channel and the recess, the web following the course of the channel, and including a lasting connection between the two housing parts comprising the bonding agent being composed of a free-flowing material which is at least similar to the material from which the housing parts are made.

21. Distributor device for a chemical analysis arrangement according to claim 20, in which the recess is formed in the same housing part as the channel.

22. Distributor device for a chemical analysis arrangement according to claim 20, in which the recess is connected to a feed opening which passes through one of the housing parts.

23. Distributor device for a chemical analysis arrangement according to claim 20, in which the channel is in connection with connecting openings which pass through a housing part.

24. Distributor device for a chemical analysis arrangement according to claim 20, in which the separating web being of approximately linear form in the region of the contact face.

25. Distributor device for a chemical analysis arrangement according to claim 24, in which the separating web widens from the contact face towards the housing part which carries it.

26. Distributor device for a chemical analysis arrangement according to claim 20, in which the material is free-flowing in a warmed state and hardens on cooling.

27. Distributor device for a chemical analysis arrangement according to claim 20, in which the material is injection-mouldable.

28. Distributor device for a chemical analysis arrangement according to claim 20, in which the material is a plastics material.

29. Distributor device for a chemical analysis arrangement according to claim 20, in which the material of the housing parts and of the bonding agent is aluminum.

30. Distributor device for a chemical analysis arrangement according to claim 20, in which the bonding agent is an adhesive.

31. Distributor device for a chemical analysis arrangement according to claim 20, in which at least one of the channels and the recesses is provided in both contact faces.

32. Distributor device for a chemical analysis arrangement according to claim 20, in which more than two housing parts superimposed one on top of the other in the manner of a stack are provided, the housing parts arranged inside the stack having two contact faces.

33. Distributor device for a chemical analysis arrangement according to claim 20, in which the channel is a milled channel.

34. Distributor device for a chemical analysis arrangement according to claim 20, in which the channel is a stamped channel.

35. Distributor device for a chemical analysis arrangement according to claim 20, in which the housing part having the channel is constructed as a casting cast with the channel.

36. Distributor device for a chemical analysis arrangement according to claim 20 including several channels separated by at least one space, the space being occupied substantially by the recess.

* * * * *

UNITED STATES PATENT AND TRADEMARK OFFICE
CERTIFICATE OF CORRECTION

PATENT NO. : 6,117,395
DATED : September 12, 2000
INVENTOR(S) : Ole Ploug, et al.

It is certified that error appears in the above-identified patent and that said Letters Patent is hereby corrected as shown below:

On the title page, item [73] Assignee, should read:

--Danfoss A/S, Denmark, Germany --.

Signed and Sealed this

Eighth Day of May, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,117,395
DATED : September 12, 2000
INVENTOR(S) : Ole Ploug, et al.

It is certified that error appears in the above-identified patent and that said Letters Patent is hereby corrected as shown below:

Title page,
Item [73] Assignee, should read: -- Danfoss A/S Nordborg, Denmark --

Signed and Sealed this

Second Day of October, 2001

Attest:

*Nicholas P. Godici*

NICHOLAS P. GODICI
*Attesting Officer*     *Acting Director of the United States Patent and Trademark Office*